US010775507B2

(12) United States Patent
Mandai et al.

(10) Patent No.: US 10,775,507 B2
(45) Date of Patent: Sep. 15, 2020

(54) ADAPTIVE TRANSMISSION POWER CONTROL FOR A LIDAR

(71) Applicant: Apple Inc., Cupertino, CA (US)

(72) Inventors: Shingo Mandai, Mountain View, CA (US); Cristiano L Niclass, San Jose, CA (US); Richard E Bills, San Jose, CA (US); Moshe Laifenfeld, Haifa (IL); Mina A. Rezk, Haymarket, VA (US); Alexander Shpunt, Portola Valley, CA (US); Ron Sokolovsky, Sunnyvale, CA (US); Tal Kaitz, Kiryat Ono (IL); Ronen Akerman, Sunnyvale, CA (US); Jason D. Mudge, San Francisco, CA (US); Andrew J Sutton, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 500 days.

(21) Appl. No.: 15/673,428

(22) Filed: Aug. 10, 2017

(65) Prior Publication Data
US 2018/0081061 A1     Mar. 22, 2018

Related U.S. Application Data

(60) Provisional application No. 62/397,943, filed on Sep. 22, 2016.

(51) Int. Cl.
*G01S 17/00*     (2020.01)
*G01S 17/89*     (2020.01)
(Continued)

(52) U.S. Cl.
CPC ............ *G01S 17/89* (2013.01); *G01B 11/026* (2013.01); *G01S 7/484* (2013.01); *G01S 7/4814* (2013.01);
(Continued)

(58) Field of Classification Search
USPC .................................. 356/4.01, 5.01
See application file for complete search history.

(56) References Cited

U.S. PATENT DOCUMENTS

| 4,240,746 A | * | 12/1980 | Courtenay | .............. G01S 7/484 |
| | | | | 356/5.05 |
| 7,969,558 B2 | * | 6/2011 | Hall | ...................... G01S 7/4811 |
| | | | | 356/5.01 |

(Continued)

FOREIGN PATENT DOCUMENTS

| EP | 3006953 A1 | 4/2016 |
| JP | H11352226 A | 12/1999 |

OTHER PUBLICATIONS

Charbon et al., "SPAD-Based Sensors", TOF Range-Imaging Cameras, Springer-Verlag, pp. 11-38, year 2013.

(Continued)

*Primary Examiner* — James R Hulka
(74) *Attorney, Agent, or Firm* — Kligler & Associates Patent Attorneys Ltd

(57) ABSTRACT

An electro-optical device includes a laser, which is configured to emit toward a scene pulses of optical radiation. An array of detectors are configured to receive the optical radiation that is reflected from points in the scene and to output signals indicative of respective times of arrival of the received radiation. A controller is coupled to drive the laser to emit a sequence of pulses of the optical radiation toward each of a plurality of points in the scene and to find respective times of flight for the points responsively to the output signals, while controlling a power of the pulses emitted by the laser by counting a number of the detectors outputting the signals in response to each pulse, and reducing the power of a subsequent pulse in the sequence when the number is greater than a predefined threshold.

18 Claims, 3 Drawing Sheets

(51) Int. Cl.
- *G01S 7/486* (2020.01)
- *G01S 7/4863* (2020.01)
- *G01S 7/484* (2006.01)
- *G01S 7/4865* (2020.01)
- *G01S 17/10* (2020.01)
- *G01B 11/02* (2006.01)
- *G01S 7/481* (2006.01)
- *G02F 1/29* (2006.01)

(52) U.S. Cl.
CPC .......... *G01S 7/4817* (2013.01); *G01S 7/4863* (2013.01); *G01S 7/4865* (2013.01); *G01S 7/4868* (2013.01); *G01S 17/10* (2013.01); *G02F 1/292* (2013.01)

(56) References Cited

U.S. PATENT DOCUMENTS

| | | | | |
|---|---|---|---|---|
| 8,963,069 | B2* | 2/2015 | Drader | G01S 17/026 250/214.1 |
| 9,997,551 | B2* | 6/2018 | Mandai | H01L 27/14609 |
| 2003/0227614 | A1 | 12/2003 | Taminiau et al. | |
| 2012/0249998 | A1 | 10/2012 | Eisele et al. | |
| 2013/0208258 | A1* | 8/2013 | Eisele | G01S 7/4913 356/5.01 |
| 2013/0300838 | A1* | 11/2013 | Borowski | G01S 7/486 348/46 |
| 2014/0231630 | A1* | 8/2014 | Rae | G01S 17/10 250/214.1 |
| 2014/0353471 | A1* | 12/2014 | Raynor | G01J 1/1626 250/214 C |
| 2015/0200222 | A1* | 7/2015 | Webster | H01L 31/107 250/208.1 |
| 2015/0200314 | A1* | 7/2015 | Webster | H01L 27/14612 250/208.1 |
| 2017/0052065 | A1 | 2/2017 | Sharma et al. | |
| 2017/0179173 | A1 | 6/2017 | Mandai et al. | |

OTHER PUBLICATIONS

International Application # PCT/US2017/040648 search report dated Oct. 24, 2017.

* cited by examiner

ADAPTIVE TRANSMISSION POWER CONTROL FOR A LIDAR

CROSS-REFERENCE TO RELATED APPLICATION

This application claims the benefit of U.S. Provisional Patent Application 62/397,943, filed Sep. 22, 2016, which is incorporated herein by reference.

FIELD OF THE INVENTION

The present invention relates generally to range sensing, and particularly to devices and methods for depth mapping based on time-of-flight measurement.

BACKGROUND

Time-of-flight (ToF) imaging techniques are used in many depth mapping systems (also referred to as 3D mapping or 3D imaging). In direct ToF techniques, a light source, such as a pulsed laser, directs pulses of optical radiation toward the scene that is to be mapped, and a high-speed detector senses the time of arrival of the radiation reflected from the scene. The depth value at each pixel in the depth map is derived from the difference between the emission time of the outgoing pulse and the arrival time of the reflected radiation from the corresponding point in the scene, which is referred to as the "time of flight" of the optical pulses. The radiation pulses that are reflected back and received by the detector are also referred to as "echoes."

Single-photon avalanche diodes (SPADs) are detectors capable of capturing individual photons with very high time-of-arrival resolution, on the order of a few tens of picoseconds. They may be fabricated in dedicated semiconductor processes or in standard CMOS technologies. Arrays of SPAD sensors, fabricated on a single chip, have been used experimentally in 3D imaging cameras. Charbon et al. provide a review of SPAD technologies in "SPAD-Based Sensors," published in *TOF Range-Imaging Cameras* (Springer-Verlag, 2013).

SUMMARY

Embodiments of the present invention that are described hereinbelow provide improved LiDAR systems and methods for ToF-based ranging and depth mapping.

There is therefore provided, in accordance with an embodiment of the invention, an electro-optical device, including a laser, which is configured to emit toward a scene pulses of optical radiation, and an array of detectors, which are configured to receive the optical radiation that is reflected from points in the scene and to output signals indicative of respective times of arrival of the received radiation. A controller is coupled to drive the laser to emit a sequence of pulses of the optical radiation toward each of a plurality of points in the scene and to find respective times of flight for the points responsively to the output signals, while controlling a power of the pulses emitted by the laser by counting a number of the detectors outputting the signals in response to each pulse, and reducing the power of a subsequent pulse in the sequence when the number is greater than a predefined threshold.

In a disclosed embodiment, the detectors are single-photon detectors, such as single-photon avalanche detectors (SPADs).

In some embodiments, the controller is configured to reduce the power of the subsequent pulse in the sequence by at least one predetermined attenuation factor. In one such embodiment, the controller is configured to attenuate the power of subsequent pulses in multiple steps of a predetermined ratio until the number of the detectors outputting the signals falls below the predefined threshold.

In some embodiments, the device includes a scanner configured to scan the pulses of optical radiation across the scene. Typically, the controller is configured to construct a depth map of the scene based on the respective time of flight found at the plurality of points while scanning the pulses. In one embodiment, the controller is configured to activate a respective subset of the detectors at a location in the array that receives the reflected optical radiation at each point in synchronization with scanning the pulses. Additionally or alternatively, the controller is configured to set the power of the pulses at some of the points to the reduced power that was used at a preceding point while scanning the pulses.

In a disclosed embodiment, the controller includes an adder, which is coupled to receive the signals from the detectors and to output a numerical signal indicative of the number of the detectors outputting signals. A comparator is configured to compare the numerical signal from the adder to the predetermined threshold and to generate a command signal when the signal exceeds the predetermined threshold. A pulse generator generates, in response to the command signal, an adaptive power control signal, which controls a drive current of the laser responsively to the adaptive power control signal.

There is also provided, in accordance with an embodiment of the invention, a method for sensing, which includes emitting a sequence of pulses of optical radiation toward each of a plurality of points in the scene. The optical radiation that is reflected from points in the scene is received in an array of detectors, which output signals indicative of respective times of arrival of the received radiation. Respective times of flight are found for the points responsively to the output signals. A power of the emitted pulses is controlled by counting a number of the detectors outputting the signals in response to each pulse, and reducing the power of a subsequent pulse in the sequence when the number is greater than a predefined threshold.

The present invention will be more fully understood from the following detailed description of the embodiments thereof, taken together with the drawings in which:

DETAILED DESCRIPTION OF EMBODIMENTS

Figure 1:
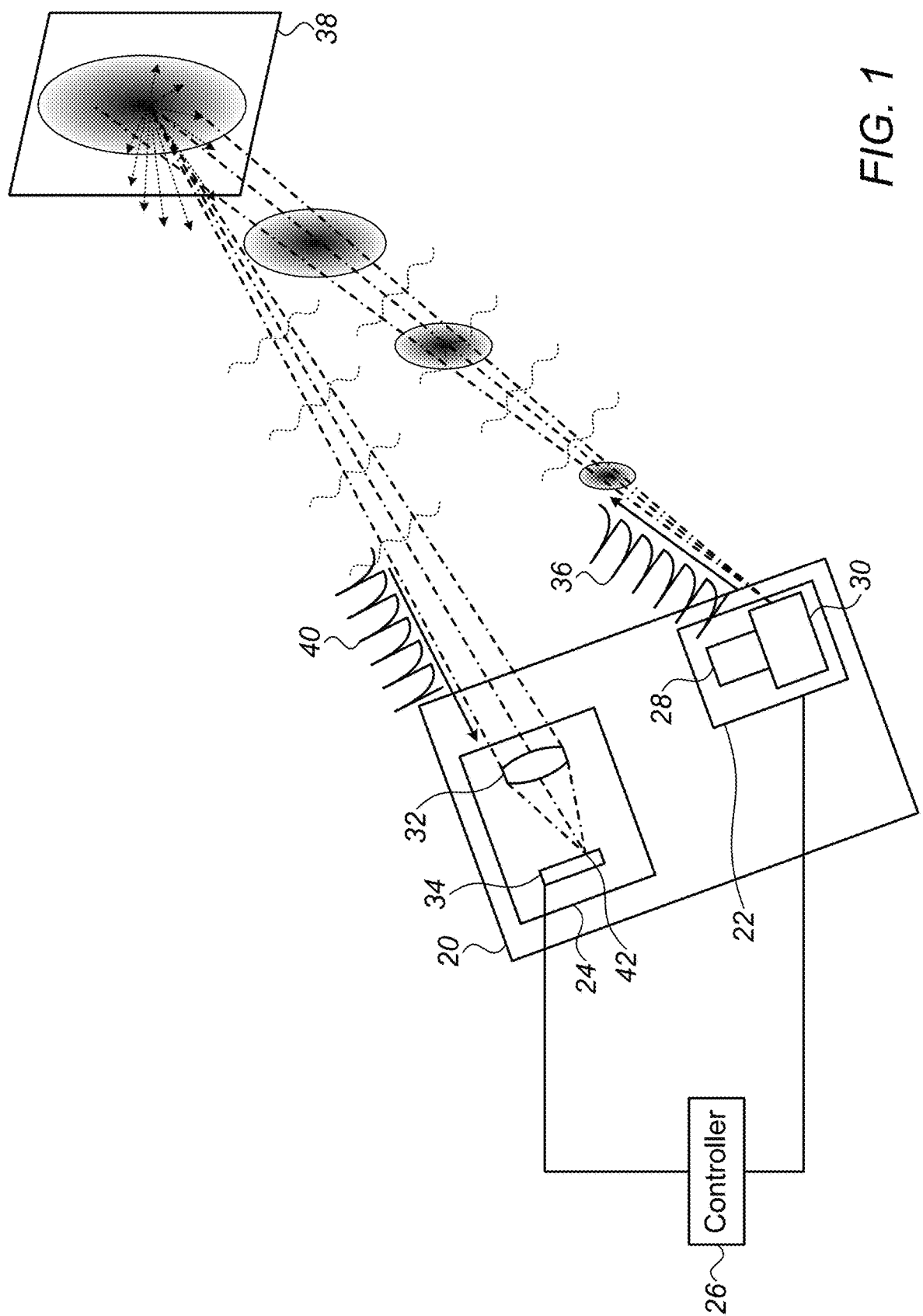
FIG. 1 is a schematic illustration of an electro-optical device with adaptive transmission power control, in accordance with an embodiment of the invention.

The quality of measurement of the distance to each point in a scene using a LiDAR is often compromised in practical implementations by a number of environmental, fundamental, and manufacturing challenges. An example of environmental challenges is the presence of uncorrelated background light, such as solar ambient light, in both indoor and outdoor applications, typically reaching a spectral irradiance of 1 W/(m²-nm). Fundamental challenges are related to losses incurred by optical signals upon reflection from the surfaces in the scene, especially due to low-reflectivity surfaces and limited optical collection aperture, as well as electronic and photon shot noises. These limitations often generate inflexible trade-off relationships that can push the designer to resort to solutions involving large optical apertures, high optical power, narrow field-of-view (FoV), bulky mechanical construction, low frame rate, and the restriction of sensors to operation in controlled environments.

LiDAR systems in uncontrolled environments can suffer from problems of dynamic range due to the varying distances of reflectivities of objects from which the laser pulses reflect. High-intensity laser pulses are needed for distant and low-reflectivity objects, but will cause saturation of the detectors receiving radiation reflected from nearby and high-reflectivity objects. This saturation, in turn, causes a temporal bias error in the signal output by the detectors, which indicates the time of arrival of the pulse, and thus distort the corresponding time-of-flight determination. The bias error may reach 1 ns, corresponding to an error in depth mapping of 15 cm. Saturation of the detector array may also distort measurements of the reflectivity of the scene.

Embodiments of the present invention that are described herein provide an electro-optical device functioning as a LiDAR, which is configured to adjust its laser power to prevent this sort of temporal bias error in the determination of time of arrival due to the saturation. Specifically, the laser power is adjusted based on monitoring the number of detectors responding to a given laser pulse, as an indicator of possible saturation. This adaptive adjustment of laser power can be useful in extending the dynamic range of the LiDAR, i.e., the range of distances over which the LiDAR gives reliable readings. Preventing saturation of the detector array also supports accurate readings of the scene reflectivities measured by the LiDAR.

In the disclosed embodiments, the electro-optical device comprises a laser, an array of detectors, and a controller, which is coupled to the laser and to the detector array. The controller drives the laser to emit a sequence of pulses of optical radiation towards the scene, from which the pulses are reflected to the array of detectors. Each detector detecting a pulse emits a signal to the controller, with the signal indicating the time of arrival of the pulse. In order to scan the points in the scene, the electro-optical device may also comprise a scanner, coupled to the controller.

The controller monitors the number of detectors from which it receives a signal for a given laser pulse, in order to detect a possible saturation of the detectors. As will be detailed below, the saturation of the responding detectors can result in distortion of the signal indicating the time of arrival, and this distortion introduces a bias error in the depth mapping. Thus, when the number of detectors outputting signals in response to a given pulse is greater than a predefined threshold, the controller reduces the power of subsequent pulses in the sequence in order to mitigate the saturation and thus achieve a more accurate ToF measurement.

The detection of saturation is based on the fact that the laser pulse reflected from the scene extends over an area of the detector array and typically has Gaussian or other centrally-peaked spatial and temporal distributions of irradiance. Each detector in the array will typically respond more efficiently to the first photon of the reflected radiation that reaches it from a given laser pulse due to the effects of so-called dead time. (Dead time is defined as the recovery time a single-photon detector requires after having detected a photon in order to gain back its nominal detection efficiency.) Ideally, the arrival times of these photons will have a statistical spread corresponding to the spatial and temporal spreads of the pulse. As the laser intensity increases, the number of detectors "firing" (i.e., emitting an output signal indicating the detection of a photon) will increase; but the distribution should remain the same as long as there is no saturation. Thus, up to the saturation level, the number of firing detectors will scale roughly linearly with the peak power of the pulse.

Saturation, on the other hand, will be characterized by an excessive number of firing detectors, as well as distortion of the apparent temporal distribution (and hence of the time of arrival measurement) as multiple photons are incident on at least some of the firing detectors. Temporal distortion is caused by dead time, as the probability of detecting a photon from the trailing portion of an optical pulse depends on the probability of not having detected any photon in the leading portion of the same pulse. Statistically, as the mean number of incident photons per pulse on each detector increases, the resulting temporal distribution of detected arrival times is skewed towards the leading edge of the pulse.

Thus, the controller compares the number of firing detectors in response to each laser pulse to a certain threshold, which may be set empirically. If the comparison indicates that the detector array is not saturated, the controller derives the time-of-flight data from the signals received from the detector array, and calculates the scene depth. If, on the other hand, the comparison indicates a saturation of the detector array, the controller transmits to the laser a command to send the next pulse at a lower power. If the comparison in response to this next pulse still indicates saturation, the controller keeps attenuating the power of the laser in subsequent pulses until the detector array is no longer saturated. At this point the signals from the detector array are accepted as valid indications of time of arrival, and the scene depth is calculated using the time-of-flight data based on these signals.

For the case in which the distance to a point in the scene is unknown (for instance, for the first depth measurement or in a scene that is changing dynamically), the first pulse toward a given point of the scene is emitted at the maximum emission power of the laser in order to receive a valid signal even if the point is distant or has low reflectivity. The controller then attenuates the power for subsequent pulses as necessary when the number of firing detectors is over threshold. The power may be attenuated in steps of a fixed, predetermined ratio by, for example, halving the laser power at each step. Alternatively, the controller may dynamically change the amount by which the power is attenuated by considering, for instance, the dead time of the single-photon detectors, the spatial extent of the unsaturated region in the detector array, and/or the extent of the scene.

The above measurement sequence, in which the first pulse is emitted at the maximum emission power, may be repeated for each point of the scene. Alternatively, the final emission power directed to a given point may be used for neighboring points, with a reset to maximum emission power performed at a distance of a preset number of scan points from the given point.

In some embodiments, the detector array comprises single-photon avalanche diodes (SPADs), which can be operated effectively in this manner. The description that follows will therefore relate specifically, for the sake of concreteness and clarity, to SPAD arrays, but the principles of the present invention may similarly be applied to detectors of other types.

In order to synchronize the detection of the received pulses with the scanning of the scene, the controller may dynamically activate a subset of the SPADs in the SPAD array such that this subset encompasses the present location of the reflected laser pulse that is imaged onto the array. (The region of sensitivity of the SPAD array may be selected and scanned along with the illumination spot by appropriately setting the bias voltages of the SPADs in synchronization with the scanning of the laser beam, as described, for example, in U.S. patent application Ser. No. 14/975,790, filed Dec. 20, 2015, whose disclosure is incorporated herein by reference.) The size of the subset may be chosen to allow for some scanning of the laser beam without the need to re-define the subset. Periodically, the controller defines a new subset of SPADs, raises the initial laser pulse again to a maximum level, and starts anew the sequence of testing for saturation and subsequent adjustment of power level of the laser.

In an environment where additional electro-optical devices emit high-power laser pulses, one of these pulses may accidentally reach the detector array of the LiDAR and saturate it. The controller of the LiDAR may interpret this saturation to be due to the emitted laser power of the LiDAR itself, and will consequently lower its laser power. In an embodiment, for avoiding such an erroneous action, the LiDAR may be equipped with the capability of making its decisions to lower the laser power based on two or three consecutively received laser pulses, rather than just one.

Although the embodiments described hereinbelow use a single threshold on the number of firing detectors in deciding whether to lower the laser pulse intensity, in an alternative embodiment, multiple thresholds can be defined for enabling several levels of response. Each threshold may be assigned a different ratio of power attenuation, and the power is attenuated by the ratio assigned to the highest exceeded threshold. Attenuating the laser power by an amount dependent on the exceeded threshold will, in the case of high level of saturation, adjust the laser power faster to an acceptable level. In the case of a low saturation level, a too-drastic attenuation of the laser power is avoided.

FIG. 1 is a schematic illustration of an electro-optical device 20 with adaptive transmission power control, in accordance with an embodiment of the invention. Electro-optical device 20 comprises a light source 22, a receiver 24, and a controller 26, which is coupled to light source 22 and to receiver 24. (The term "light" as used herein refers to optical radiation, which may be in any of the visible, infrared and ultraviolet ranges.) Light source 22 comprises a laser 28 and a scanner 30. Receiver 24 comprises collection optics 32 and a SPAD array 34.

Controller 26 drives laser 28 to emit pulses of optical radiation, which are projected by scanner 30 as an emitted beam of pulses 36 and scanned, under the control of controller 26, across a scene 38. Scene 38 is shown here, for the sake of simplicity, as an abstract flat surface, but in general, the scene that is mapped has a more complex and possibly dynamic topology. A portion of emitted beam of pulses 36 is reflected towards receiver 24 as a received beam of pulses 40. Received beam of pulses 40 is collected by collection optics 32 and imaged to a location 42 on SPAD array 34.

At the beginning of the depth measurement sequence for a given point in scene 38, controller 26 drives laser 28 to emit a pulse at a predefined maximum emission power. Controller 26, in conjunction with driving scanner 30, activates a subset of SPADs (not shown) around location 42 in SPAD array 34, so that received beam of pulses 40 is completely within this subset of SPADs. Controller 26 receives the signals output by the activated subset of SPADs, and determines whether the number of firing SPADs in the subset is saturated or not by comparing the number of firing SPADs to a predetermined threshold.

When the number exceeds the threshold, controller 26 determines that the SPAD array is saturated, and commands laser 28 to emit the next pulse at a lower emission power. Again controller 26 compares the number of firing SPADs to the predetermined threshold, and adjusts the emission power of laser 28, until such a level of emission power is reached that the number of firing SPADs in the subset is below the saturation threshold. At this point in the sequence of pulses, controller 26 accepts the signals from the subset of SPADs as valid signals for a time-of-flight measurement, and estimates the depth of the illuminated point in scene 38 on this basis. Controller 26 may instruct laser 28 to emit multiple pulses at this level and make multiple, successive depth measurements on this basis, at the same point or subsequent points of the scan.

As scanner 30 continues to scan the emitted beam of pulses 36 over scene 38, controller 26 periodically resets the emission power of laser 28 to the maximum. For example, the laser power may be reset after location 42 on SPAD array 34 has moved by 6-7 SPADs. The process of power adjustment described above is then repeated.

Although controller 26 is shown, for the sake of simplicity, as a separate, unitary element, in practice controller 26 may comprise distributed processing components that are integrated with SPAD array 34. The SPAD array typically comprises integrated sensing and processing circuits, as described, for example, in U.S. patent application Ser. No. 14/830,760, filed Aug. 20, 2015, whose disclosure is incorporated herein by reference, as well as in the above-mentioned U.S. patent application Ser. No. 14/975,790.

Figure 2:
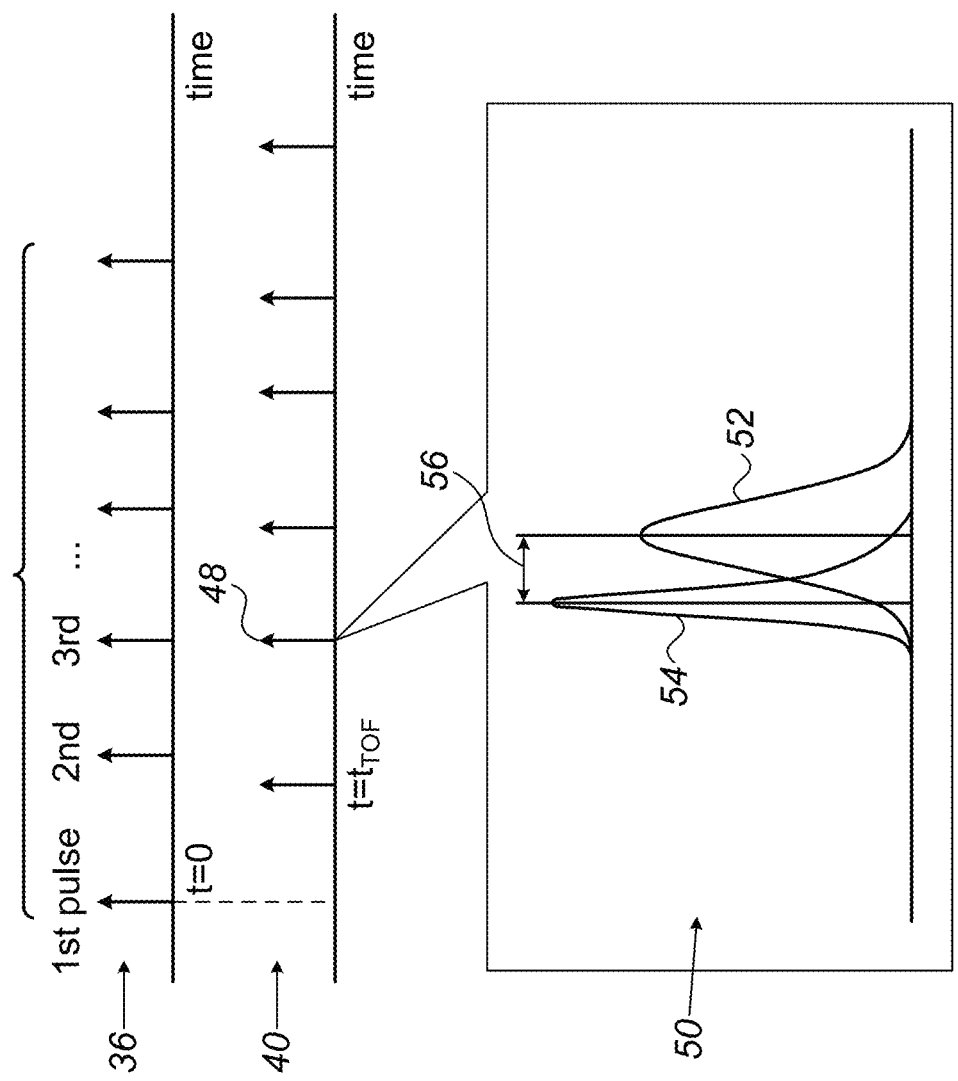
FIG. 2 is a schematic representation of an emitted beam of pulses and a received beam of pulses, in accordance with an embodiment of the invention.

FIG. 2 is a schematic illustration of emitted beam of pulses 36 and received beam of pulses 40 (referring to the elements shown in FIG. 1), in accordance with an embodiment of the invention. Received beam of pulses 40 is shifted from the emitted beam of pulses 36 by the amount of time of flight $t_{TOF}$. This figure illustrates the possible effect of saturation on measured time of flight, which is mitigated by the techniques described herein.

For demonstrating the effect of the saturation, the signal received by controller 26 from the activated subset of SPADs in location 42 from a single received pulse 48 is shown schematically. A frame 50 shows two examples of signals: A signal 52 from a non-saturated subset of SPADs, and a signal 54 from a saturated subset of SPADs. Signal 52 is obtained when pulse 48 is sufficiently low, due to an appropriate match between the distance to the measured point on scene 38 and the emission power of the emitted pulse. Signal 54 is obtained when the power of the emitted pulse resulting in received pulse 48 is too high, due to too high an emission power of laser 28 for a given distance to the measured point of scene 38. The narrow and shifted profile of signal 54 as compared to signal 52 is due to most or all of the activated SPADs firing in a very short time due to the leading photons of a high-irradiance received pulse 48. The difference between the times of arrival determined from signals 52 and 54 is a bias error 56, whose magnitude depends on the power of received pulse 48. The value of bias error 56 may reach 1 ns, which translates into a 1 ns error in the determination of time of arrival, which, in turn, translates into an error of 15 cm in the determination of the depth of scene 38 at the measured point.

Figure 3:
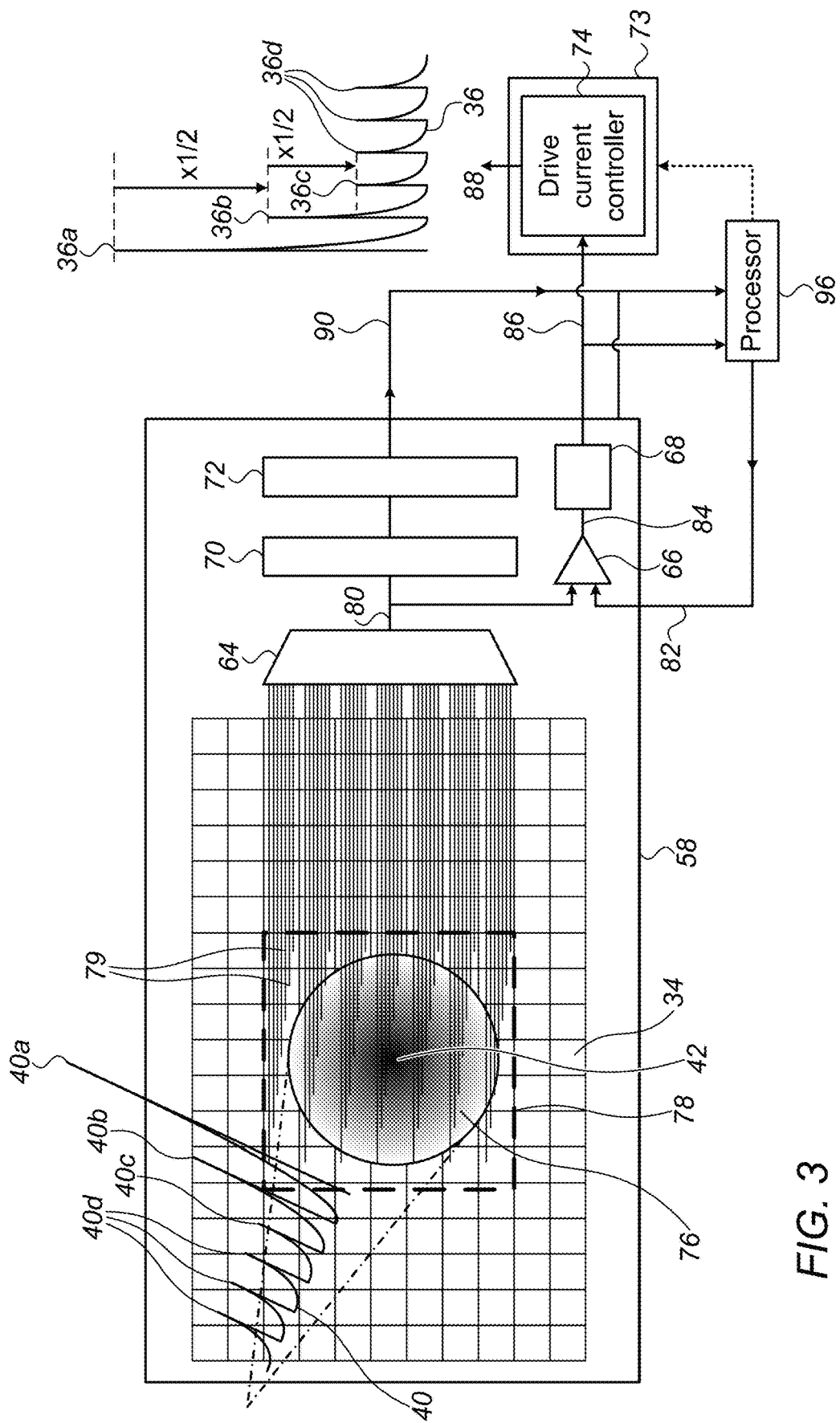
FIG. 3 is a block diagram that schematically illustrates a SPAD array and associated control and processing circuits, in accordance with an embodiment of the invention.

FIG. 3 is a block diagram that schematically illustrates SPAD array 34 and associated control and processing circuits, in accordance with an embodiment of the invention. The illustrated circuits process signals from SPAD array 34 and control laser 28 (FIG. 1). The control and processing circuits shown in FIG. 3 can be considered to be components of controller 26 that is shown in FIG. 1.

A detector chip 58 comprises SPAD array 34, along with elements of controller 26 including a pipeline adder 64, a (digital) comparator 66, a pulse generator 68, digital signal processing (DSP) circuitry 70, and readout circuitry 72. A laser driver chip 73 comprises a drive current controller 74. A processor 96 is coupled to detector chip 58 (with coupling to comparator 66, to pulse generator 68, and to readout circuitry 72 explicitly shown), to laser driver chip 73, and to scanner 30 (not shown). Within detector chip 58, pipeline adder 64 is coupled to selectively read out SPADs 79 that are within the current subset 78 of SPAD array 34, and feeds the results to comparator 66, and to DSP circuitry 70. Comparator 66 is further coupled, either via processor 96 or directly, to pulse generator 68 which, in turn, is coupled to laser drive controller 74 and to processor 96. DSP circuitry 70 is further coupled to readout circuitry 72, which, in turn, is coupled to a processor 96.

Alternatively, processor 96 is coupled to laser driver current controller 74, thus obviating the need for coupling pulse generator 68 to laser driver current controller 74. In order to reduce the timing latency between comparator 66 and laser driver current controller 74, pulse generator can be directly coupled to laser driver current controller 74. Pulse generator 68 provides an interface function by which detector chip 58 outputs a voltage or current pulse with a finite duration that can be easily detected by laser driver current controller 74 and processor 96. The interface function of pulse generator avoids possible problems that could result from the voltage pulses at the output of comparator 66 being too short for propagating outside detector chip 58.

Further referring to the elements shown in FIG. 1, emitted beam of pulses 36 is emitted, by a command from controller 26, by laser 28, and reflected by scene 38 as received beam of pulses 40. Received beam of pulses 40 illuminates the area of SPAD array 34 at location 42. While controlling scanner 30 to define the direction of emitted beam of pulses 36, controller 26 also activates the corresponding subset 78 of SPAD array 34 around location 42, and configures the inputs to pipeline adder 64 to be connected to SPADs 79 in subset 78.

When a pulse of received beam of pulses 40 is received by SPAD array 34, pipeline adder 64 adds the number of SPADs in subset 78 that have fired (not explicitly shown among SPADs 79), and transmits the number as a numerical signal 80 to an input of comparator 66. The other input to comparator 66 is a threshold 82 determined by processor 96. If comparator 66 determines that signal 80 exceeds signal 82, i.e., the number of firing SPADs in subset 78 is higher than the threshold determined by the controller (indicating saturation of subset 78), the comparator issues a command signal 84 to pulse generator 68. Pulse generator 68, upon receiving signal 84, issues an adaptive power control signal 86 to drive current controller 74, which, in response, attenuates a laser drive current 88 by an amount determined by processor 96. Once processor 96, by monitoring the above signals, determines that the number of firing SPADs in subset 78 is not saturated and consequently no further attenuating of laser drive current 88 is required, it reads an output signal 90 from readout circuitry 72, which now represents a valid time-of-flight signal.

Referring to emitted beam of pulses 36 and received beam of pulses 40 in FIG. 3, a first emitted pulse 36a is emitted by laser 28 at its highest power, generating a first received pulse 40a. In the present example, first received pulse 40a saturates the number of firing SPADs in subset 78. This causes the power of a second emitted pulse 36b to be attenuated by a predetermined attenuation factor, such as a factor of two, through the above-mentioned circuitry and signal processing, causing a second received pulse 40b to be a factor of two lower in power than first received pulse 40a. In the embodiment shown in FIG. 3, second received pulse 40b still saturates the number of firing SPADs in subset 78, requiring another halving of the pulse power. The resulting third received pulse 40c no longer saturates the number of firing SPADs in subset 78, and signal 90 is accepted by processor 96 as a valid signal of time of flight. In the pictured example, three additional emitted pulses 36d are emitted by laser 28 at the same power as emitted pulse 36c, resulting in received pulses 40d, for increasing the signal-to-noise ratio (SNR) in time-of-flight signal 90.

ToF measurements of high-intensity pulses showing signs of saturation may simply be discarded, as explained above, but alternatively, these saturated measurements may be incorporated into the depth map at certain points. For example, at an edge in a scene between nearby and more distant targets, reflections of high-intensity pulses from the closer target will cause saturation, but may still provide useful ToF information with regard to the more distant target. To handle this sort of situation, ToF measurements for longer distances can be accumulated following the high-intensity pulses even in cases of saturation. These high-intensity measurements can be combined with lower-intensity, non-saturated measurements of shorter distances in order to enhance edge resolution in the depth map.

Although the disclosed embodiment uses a factor of two for attenuating the power of successive emitted pulses 36, other factors, as well as other sequences, for attenuating the power of emitted pulses 36 can be used in alternative embodiments of the invention. Alternatively, processor 96 may dynamically change the amount by which the power is attenuated by considering, for instance, the dead time of the SPADs, the spatial extent of the unsaturated region in subset 78, and/or the extent of scene 38.

Although the embodiments described hereinabove relate specifically to arrays of SPADs, the principles of the present invention may similarly be applied to other types of single-photon detectors, as well as other radiation sensors operating in Geiger mode. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An electro-optical device, comprising:
   a laser, which is configured to emit toward a scene pulses of optical radiation;
   an array of single-photon detectors, which are configured to:
   receive the optical radiation that is reflected from points in the scene, and emit, upon detecting a photon, one or more output signals indicative of respective times of arrival of received photons, while the single-photon detectors that have not detected any photon do not emit the output signals indicative of the respective times of arrival; and a controller, which is coupled to drive the laser to emit a sequence of pulses of the optical radiation toward each of a plurality of points in the scene and to find respective times of flight for the points responsively to the output signals, while controlling a power of the pulses emitted by the laser by counting a number of the detectors that have emitted the output signals in response to each pulse, and when the number of the detectors that have emitted the output signals in response to a given pulse is greater than a threshold, reducing the power of a subsequent pulse in the sequence.

2. The electro-optical device according to claim 1, wherein the single-photon detectors are single-photon avalanche detectors (SPADs).

3. The electro-optical device according to claim 1, wherein the controller is configured to reduce the power of the subsequent pulse in the sequence by at least one predetermined attenuation factor.

4. The electro-optical device according to claim 3, wherein the controller is configured to attenuate the power of subsequent pulses in multiple steps of a predetermined ratio until the number of the detectors outputting the signals falls below the predefined threshold.

5. The electro-optical device according to claim 1, and comprising a scanner configured to scan the pulses of optical radiation across the scene.

6. The electro-optical device according to claim 5, wherein the controller is configured to construct a depth map of the scene based on the respective time of flight found at the plurality of points while scanning the pulses.

7. The electro-optical device according to claim 5, wherein the controller is configured to activate a respective subset of the detectors at a location in the array that receives the reflected optical radiation at each point in synchronization with scanning the pulses.

8. The electro-optical device according to claim 5, wherein the controller is configured to set the power of the pulses at some of the points to the reduced power that was used at a preceding point while scanning the pulses.

9. The electro-optical device according to claim 1, wherein the controller comprises:
an adder, which is coupled to receive the signals from the detectors and to output a numerical signal indicative of the number of the detectors outputting signals;
a comparator, which is configured to compare the numerical signal from the adder to the predetermined threshold and to generate a command signal when the signal exceeds the predetermined threshold; and
a pulse generator, which generates, in response to the command signal, an adaptive power control signal, which controls a drive current of the laser responsively to the adaptive power control signal.

10. A method for sensing, comprising:
emitting a sequence of pulses of optical radiation toward each of a plurality of points in the scene;
receiving the optical radiation that is reflected from points in the scene in an array of single-photon detectors, which emit, upon detecting a photon, one or more output signals indicative of respective times of arrival of received photons, while the single-photon detectors that have not detected any photon do not emit the output signals indicative of the respective times of arrival;
finding respective times of flight for the points responsively to the output signals; and
controlling a power of the emitted pulses by counting a number of the detectors outputting the signals in response to each pulse, and when the number of the detectors that have emitted the output signals in response to each pulse, and when the number of the detectors that have emitted the output signals in response to a given pulse is greater than a threshold, reducing the power of a subsequent pulse in the sequence.

11. The method according to claim 10, wherein the single-photon detectors are single-photon avalanche detectors (SPADs).

12. The method according to claim 10, wherein controlling the power comprises reducing the power of the subsequent pulse in the sequence by at least one predetermined attenuation factor.

13. The method according to claim 12, wherein reducing the power comprises attenuating the power of subsequent pulses in multiple steps of a predetermined ratio until the number of the detectors outputting the signals falls below the predefined threshold.

14. The method according to claim 10, wherein emitting the sequence of pulses comprises scanning the pulses of optical radiation across the scene.

15. The method according to claim 14, and comprising constructing a depth map of the scene based on the time of flight found at the plurality of points while scanning the pulses.

16. The method according to claim 14, wherein receiving the optical radiation comprises activating a respective subset of the detectors at a location in the array that receives the reflected optical radiation at each point in in synchronization with scanning the pulses.

17. The method according to claim 14, wherein controlling the power comprises setting the power of the pulses at some of the points to the reduced power that was used at a preceding point while scanning the pulses.

18. The method according to claim 10, wherein controlling the power comprises:
receiving the signals from the detectors and outputting a numerical signal indicative of the number of the detectors outputting signals;
comparing the numerical signal to the predetermined threshold and generating a command signal when the signal exceeds the predetermined threshold; and
generating, in response to the command signal, an adaptive power control signal, which controls a drive current of a laser emitting the pulses.

* * * * *